United States Patent
DiFrancesco et al.

(10) Patent No.: US 8,368,700 B1
(45) Date of Patent: Feb. 5, 2013

(54) ANIMATRONICS ANIMATION METHOD AND APPARATUS

(75) Inventors: David DiFrancesco, Point Richmond, CA (US); Loren Carpenter, Nicasio, CA (US); Oren Jacob, Piedmont, CA (US); Warren Trezevant, Oakland, CA (US); Akhil J. Madhani, Pasadena, CA (US); Alexis P. Wieland, Los Angeles, CA (US)

(73) Assignee: Pixar, Emeryville, CA (US)

( * ) Notice: Subject to any disclaimer, the term of this patent is extended or adjusted under 35 U.S.C. 154(b) by 1367 days.

(21) Appl. No.: 11/958,163

(22) Filed: Dec. 17, 2007

Related U.S. Application Data

(60) Provisional application No. 60/870,538, filed on Dec. 18, 2006.

(51) Int. Cl.
*G06T 13/00* (2011.01)
(52) U.S. Cl. .......................... 345/473; 345/474
(58) Field of Classification Search .................. None
See application file for complete search history.

(56) References Cited

U.S. PATENT DOCUMENTS

| | | | |
|---|---|---|---|
| 2004/0210426 A1* | 10/2004 | Wood | 703/2 |
| 2005/0153624 A1* | 7/2005 | Wieland et al. | 446/269 |

* cited by examiner

*Primary Examiner* — Kee M Tung
*Assistant Examiner* — Jwalant Amin
(74) *Attorney, Agent, or Firm* — Kilpatrick Townsend & Stockton LLP; Philip H. Albert

(57) ABSTRACT

A method for specifying an animatronics unit includes receiving a force-based software model for the animatronics unit, receiving a kinematics-based software model for the animatronics unit, receiving animation data for animating the kinematics-based software model, wherein the animation data comprises artistically determined motions for the kinematics-based software model by a user, determining a plurality of driving signals in response to the animation data, animating the force-based software model of the animatronics unit in response to the plurality of driving signals, displaying animation of the force-based software model determined in response to the plurality of driving signals, and determining a specification for construction of the animatronics unit in response to animation of the force-based software model.

23 Claims, 8 Drawing Sheets

ANIMATRONICS ANIMATION METHOD AND APPARATUS

CROSS-REFERENCE TO RELATED CASES

The present invention claims priority to, and incorporates by reference, for all purposes, Application No. 60/870,538, filed Dec. 18, 2006.

BACKGROUND OF THE INVENTION

The present invention relates to Animatronics animation. More specifically, the present invention relates to methods and apparatus for animation of animatronics units using animation tools.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer-aided animation (CA) industry was Pixar. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006), "Ratatouille" (2007) and others. In addition to creating animated features, Pixar developed computing platforms specially designed for CA, and CA software now known as RenderMan®. RenderMan® was well received in the animation industry and recognized with two Academy Awards®. The RenderMan® software included a "rendering engine" that "rendered" or converted geometric and/or mathematical descriptions of animated objects or characters into a two dimensional image.

The inventors of the present invention now desire to extend the reach of its animated characters beyond two-dimension images and into the third-dimension (e.g. the physical world). To do this, the inventors have been considering constructing and controlling of physical versions e.g. electrically, mechanically, hydraulically or pneumatically controlled devices of animated characters. The use of electronically-controlled mechanical devices for live entertainment purposes was pioneered by The Walt Disney Company and is now often referred to in the industry as "animatronics." Animatronics characters have been used in many theme park attractions (e.g. rides, performances), such as Captain Jack Sparrow in the "Pirates of the Caribbean" attraction, President Lincoln in "Great Moments with Mr. Lincoln," and many others.

A problem recognized by the inventors is that because animatronics units are used for specific purposes, the hardware cannot be purchased off-the-shelf, and must often be custom-built. Further, the software control of such animatronics units must also be custom-written for the hardware. In some cases, when the hardware is so complex, the animatronics robot must still be directly operated or controlled by humans.

One major concern recognized by the inventors for animatronics units is how "realistic" or "organic" the animatronics units look and move for viewers. In the past, some animatronics devices did not look "realistic" because they moved in a "mechanical" manner. Examples of mechanical motion include: portions of the robot repeatedly moving back and forth between a set number of positions; the mechanical devices moving haltingly into different positions; the mechanical devices moving in non-natural ways; and the like.

Most commercial animatronics units used for manufacturing cannot easily be used for animatronics applications. This is because such robots are often designed for very specific purposes, e.g. welding, moving parts, and the like, and not for artistic and aesthetic purposes. Another reason is that the software control systems are proprietary and only have very specific functions enabled. Still another reason is that manufacturers of commercial robots are not interested in having the robots look "realistic" or "organic," and further, that the motion of the robot is often totally irrelevant. Accordingly, the inventors have recognized that commercial industrial robots do not now provide the level of hardware or software flexibility required for animatronics purposes.

In light of the above, what is desired are methods and apparatus providing animatronics control without the drawbacks described above.

BRIEF SUMMARY OF THE INVENTION

The present invention relates to robotic animation. More specifically, the present invention relates to methods and apparatus for animation of animatronics units using animation tools.

According to one aspect of the invention, a method for specifying an animatronics unit is described. Various techniques include receiving a force-based software model for the animatronics unit, receiving a kinematics-based software model for the animatronics unit, and receiving animation data for animating the kinematics-based software model, wherein the animation data comprises artistically determined motions for the kinematics-based software model by a user. Processes may include determining a plurality of driving signals in response to the animation data, and animating the force-based software model of the animatronics unit in response to the plurality of driving signals. Methods may include the steps of displaying animation of the force-based software model determined in response to the plurality of driving signals, and determining a specification for construction of the animatronics unit in response to animation of the force-based software model.

According to another aspect of the invention, a computer system is described. One apparatus includes a memory configured to store a force-based software model for the animatronics unit, wherein the memory is configured to store a kinematics-based software model for the animatronics unit, wherein the memory is configured to store animation data for animating the kinematics-based software model, wherein the animation data comprises artistically determined motions for the kinematics-based software model by a user. A device may include a processor coupled to the memory, wherein the processor is configured to determine a plurality of driving signals in response to the animation data, wherein the processor is configured to animate the force-based software model of the animatronics unit in response to the plurality of driving signals, and a display coupled to the processor, wherein the display is configured to display animation of the force-based software model determined in response to the plurality of driving signals. In various embodiments, the processor is also configured to output a specification for construction of the animatronics unit in response to animation of the force-based software model.

According to another aspect of the invention, a method for designing an animatronics unit is described. Various techniques include determining a force-based software model for the animatronics unit, determining a kinematics-based software model for the animatronics unit, and receiving animation data for animating the kinematics-based software model, wherein the animation data comprises artistically determined motions by a user. A technique may include animating the force-based software model in response to the animation data, displaying animation of the force-based software model determined in response to the animation data, and determining a physical implementation of the animatronics unit in response to animation of the kinematics-based software model.

According to another aspect of the invention, a method for a computer system for determining an animatronics unit is described. One technique includes receiving an animation timing sheet specifying a plurality of animation values at a first rate of values per time period, and determining a plurality of driving values at a second rate of values per time period in response to the plurality of animation values, wherein the second rate is greater than the first rate. A process may include animating the animatronics unit in response to the plurality of driving values at the second rate of values per time period.

According to yet another aspect of the invention, an animatronics device is described. Apparatus may include a plurality of motors, wherein each motor is configured to be driven by motor driving data, and a first portion and a second portion, coupled via a motor from the plurality of motors. A device may include a memory configured to store a plurality of motor driving data, wherein motor driving data associated with a the motor from the plurality of motors comprises driving data at a first rate of data per time period, wherein the driving data is determined in response to animation timing data, wherein the animation timing data comprises animation data at a second rate of data per time period, wherein the first rate exceeds the second rate, and wherein the animation timing data is determined in response to animation curve data defined by a user. A unit may include a processor coupled to the memory and to the motor, wherein the processor is configured to retrieve the motor driving data from the memory and configured to apply the motor driving data to the plurality of motors at the first rate. The animatronics device may be a toy, or prop for an amusement park ride or attraction, an amusement park ride, or other live performances, or the like.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

Figure 1:
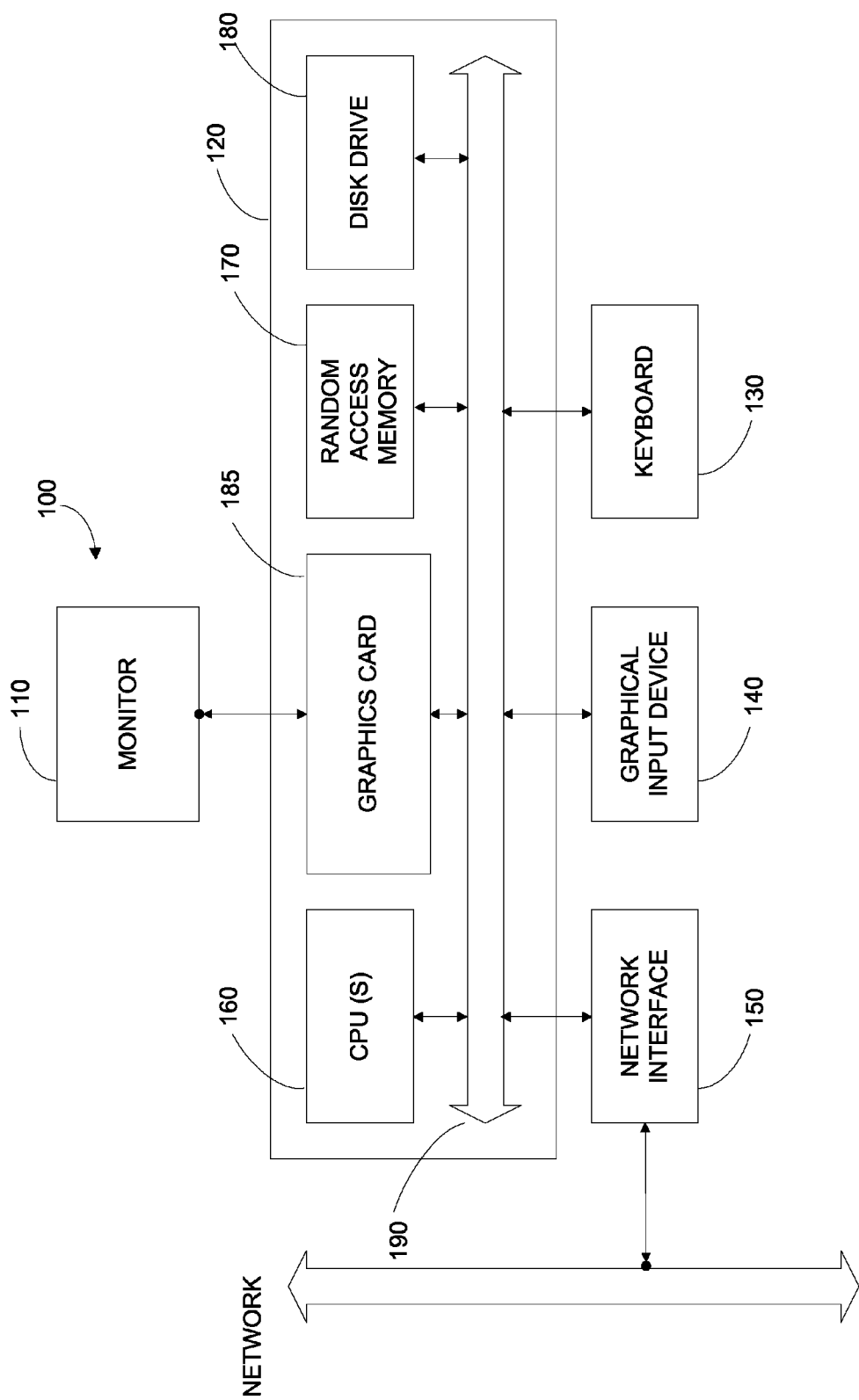
FIG. 1 is a block diagram of typical computer system according to an embodiment of the present invention.

FIG. 1 is a block diagram of typical computer system 100 according to an embodiment of the present invention.

In the present embodiment, computer system 100 typically includes a display/monitor 110, computer 120, a keyboard 130, a user input device 140, computer interfaces 150, and the like.

In the present embodiment, user input device 140 is typically embodied as a computer mouse, a trackball, a track pad, a joystick, wireless remote, drawing tablet, voice command system, eye tracking system, and the like. User input device 140 typically allows a user to select objects, icons, text and the like that appear on the monitor 110 via a command such as a click of a button or the like. In some embodiments, monitor 110 may be an interactive touch-screen, such as a Cintiq manufactured by Wacom, or the like.

Embodiments of computer interfaces 150 typically include an Ethernet card, a modem (telephone, satellite, cable, ISDN), (asynchronous) digital subscriber line (DSL) unit, FireWire interface, USB interface, and the like. For example, computer interfaces 150 may be coupled to a computer network, to a FireWire bus, or the like. In other embodiments, computer interfaces 150 may be physically integrated on the motherboard of computer 120, may be a software program, such as soft DSL, or the like.

In various embodiments, computer 120 typically includes familiar computer components such as a processor 160, and memory storage devices, such as a random access memory (RAM) 170, disk drives 180, and system bus 190 interconnecting the above components.

In one embodiment, computer 120 includes one or more Xeon microprocessors from Intel. Further, in the present embodiment, computer 120 typically includes a UNIX-based operating system.

RAM 170 and disk drive 180 are examples of tangible media configured to store data such as animation timing sheets, an animation environment, source image digital data, scanned images, scanned digital data, defect logs, image files, models including geometrical descriptions of objects, ordered geometric descriptions of objects, procedural descriptions of models, a force-based design environment, physical force-based software models of objects, scene descriptor files, a rendering engine, embodiments of the present invention, including executable computer code, human readable code, or the like. Other types of computer-readable tangible media include magnetic storage media such as floppy disks, networked hard disks, or removable hard disks; optical storage media such as CD-ROMS, DVDs and bar codes; semiconductor memories such as flash memories, read-only-memories (ROMS); battery-backed volatile memories; networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 is representative of a computer system capable of embodying various aspects of the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Xeon™, Pentium™ or Core™ microprocessors; Turion™ 64, Opteron™ or Athlon™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Figure 2:
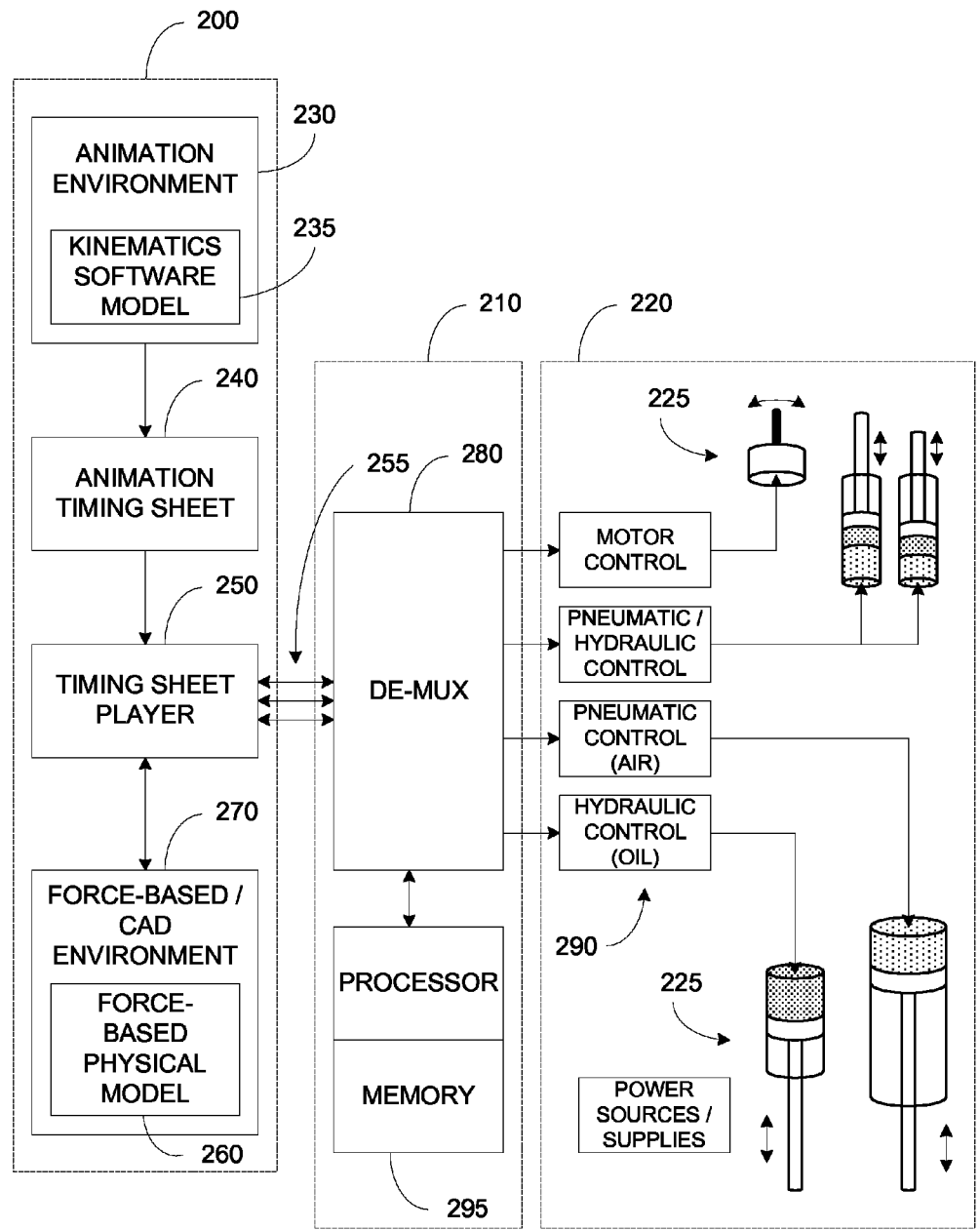
FIG. 2 illustrates a block diagram of a process according to one embodiment of the present invention.

FIG. 2 illustrates a block diagram of a system according to various embodiments of the present invention. FIG. 2 illustrates a computer system 200, coupled to control circuitry 210, and coupled to an animatronics unit 220.

In various embodiments of the present invention, computer system 200 may be embodied as a computer system 100, described above. In FIG. 2, computer system 200 may include an animation environment 230, animation timing sheets 240, a timing sheet player 250, force-based software model (e.g. computer-aided-design (CAD) data) 260, and a force-based (dynamic) design environment 270. Control circuitry 210 may include a demultiplexer 280, and in some embodiments, a processor/memory 295. As illustrated in FIG. 2, animatronics unit 220 may include control circuits 290 and motors (e.g. electrical motors, hydraulic, pneumatic units, air over oil) 225.

In some embodiments of the present invention, computer system 200 is used by users to animate animatronics unit 220. In the embodiment illustrated in FIG. 2, a kinematics-based software model 235 associated with animatronics unit 220 is provided. In various embodiments, kinematics-based software model 235 is defined by one or more users who define the geometry of an object to animate, articulation points of the object, e.g. control points of the object, control characteristics, and the like. Many software packages for creating models are well-known in the field of computer animation, such as Maya, SoftImage, or the like.

In the embodiment illustrated in FIG. 2, kinematics-based software model 235 is provided within an animation environment 230. A user, typically termed an animator, manipulates parameters of kinematics-based software model 235 with respect to time, to define the animation (movement) of the object. In some embodiments of the present invention, animation environment 230 is a Pixar proprietary modeling environment called "Menv." In other embodiments, other modeling environments could be used.

As will be described further below, the parameters that are defined by the animator become smoothly varying spline data, or the like, to appear "natural" or "realistic." Based upon such smoothly varying data, animation timing sheets 240 are determined. In various embodiments, animation timing sheets 240 (e.g. "Q" sheets) includes values typically for each parameter of kinematics-based software model 235 with respect to time. For example, animation timing sheets 240 may include values for 1,000 parameters at a rate of 24 frames per second. In some embodiments, the number of parameters will vary upon the complexity of kinematics-based software model 235, in addition, the number of frames per second may also vary. In various embodiments, animation timing sheets 240 may include parameters for a shot, a scene, a sequence, an entire feature, or the like.

In some embodiments of the present invention, computer system 200 may include a force-based design environment 270, that allows users to define a physically-based (force-based) software model 260 of the object, including a specification of materials, a specification of motors and motor properties, a specification of the physical assembly of the object, or the like. In various embodiments, force-based design environment 270 may be provided by Intergraph, AutoDesk, or the like. In various embodiments, force-based software model 260 may be designed with reference to kinematics-based software model 235. In various embodiments, force-based software model 260 may or may not be identical to kinematics-based software model 235. For instance, kinematics-based software model 235 may specify a joint that rotates in particular ways that are not physically realizable in a single joint, thus force-based software model 260 may be constructed in a different way.

In some embodiments, the force-based software model 260 may or may not reflect the actual construction of animatronics unit 220.

In some embodiments, computer system 200 need not include animation environment 230 or force-based design environment 270. In such cases, computer system 200 may receive animation data 240 and force-based software model 260, and animation environment 230 and force-based design environment 270 may be implemented in separate computer systems. In still other embodiments, force-based design environment 270 may be separated into separate software environment (e.g. packages), such as a physical design environment for specifying the construction of the animatronics unit, and a force-based simulation environment for simulating in software, the effect of force upon the specified construction of the animatronics unit.

Illustrated in FIG. 2 is animation timing sheet player 250. In various embodiments, the functionality of animation timing sheet player 250 may vary, thus some of the below-described functionality may or may not be incorporated into other functional blocks.

In various embodiments of the present invention, timing sheet player 250 receives animation timing sheet data 240, and outputs data on data bus 255 to control circuitry 210. One particular function may include the interpolating of animation timing sheet data 240 to a first number of values per second (e.g. 24), to a higher number of values (frames) per second, e.g. 100 samples per second, 1000 values per second. For instance, values of parameters at 24 fps may be increased to 50 fps, or the like. In various embodiments, a higher number of fps for the values are typically required for control circuitry 210, to control animatronics unit 220 in a smooth manner. Accordingly, timing sheet player 250 calculates the values of the parameters at the higher frame rate.

In some embodiments of the present invention, timing sheet player 250 maps parameters of kinematics-based software model 235 to controllable parameters of CAD data 260. As discussed above, the structure of the force-based software model 260 may be different from the model in kinematics-based software model 235 or that may be the same. Accordingly, in instances where they are different, a mapping is performed, to take changes in values of the software parameters and map them to appropriate changes in values in force-based software model 260. If required, additional mappings may be performed from the parameters of kinematics-based software model 235 to parameters of animatronics unit 220 and/or from the parameters of force-based software model 260 to parameters of animatronics unit 220.

In various embodiments, timing sheet player 250 may communicate with control circuitry to provide the appropriate changes in values for animatronics unit 220. In some embodiments, data bus 255 may be transferred via an external bus, such as a firewire, an internal computer bus, e.g. ISA, ESA bus, Firewire, SCSI, Bluetooth, IR, 802.11x, or the like.

In the example in FIG. 2, data on data bus 255 may be multiplexed or encoded. In various embodiments demultiplexer 280 may decode or demultiplex, the given values for the parameters. The decoded or demultiplexed signals may then be provided to animatronics control units 290. In various embodiments, demultiplexer 280 may be a plug-in board to computer system 200, or the like, and animatronics control units 290 may also be implemented into a plug-in board in computer system 200. In other embodiments, animatronics control units 290 may be external to computer system 200. In some embodiments, animatronics control units 290 may be custom circuits that are provided with motors 225. In other embodiments, animatronics control units 290 may be off-the shelf units capable of driving motors 225, or the like. Animatronics control units 290 may control motors 225 via a wired interface, a wireless interface, oil pressure, air pressure, or the like, similar to the above.

In some examples of the present embodiment, motors 225 may be commercially available electrically controllable motors. For instance, motors 225 may be stepper motors, digitally addressable motors, actuators, analog servos, or the like. In additional embodiments, motors 225 may be hydraulic or pneumatic pump driven cylinders, or the like.

In various embodiments of the present invention, animatronics unit 220 may be broadly interpreted to include any mechanical device that is desired to be moved in a "realistic," organic, and/or natural manner. In most cases, the movement that is desired should not appear unintentionally "robotic" or not "natural." Additionally, animatronics unit 220 may be controlled via electronic signals/sensors, mechanical signals/sensors (e.g. hydraulic, pneumatic), or any combination thereof.

Figure 3A:
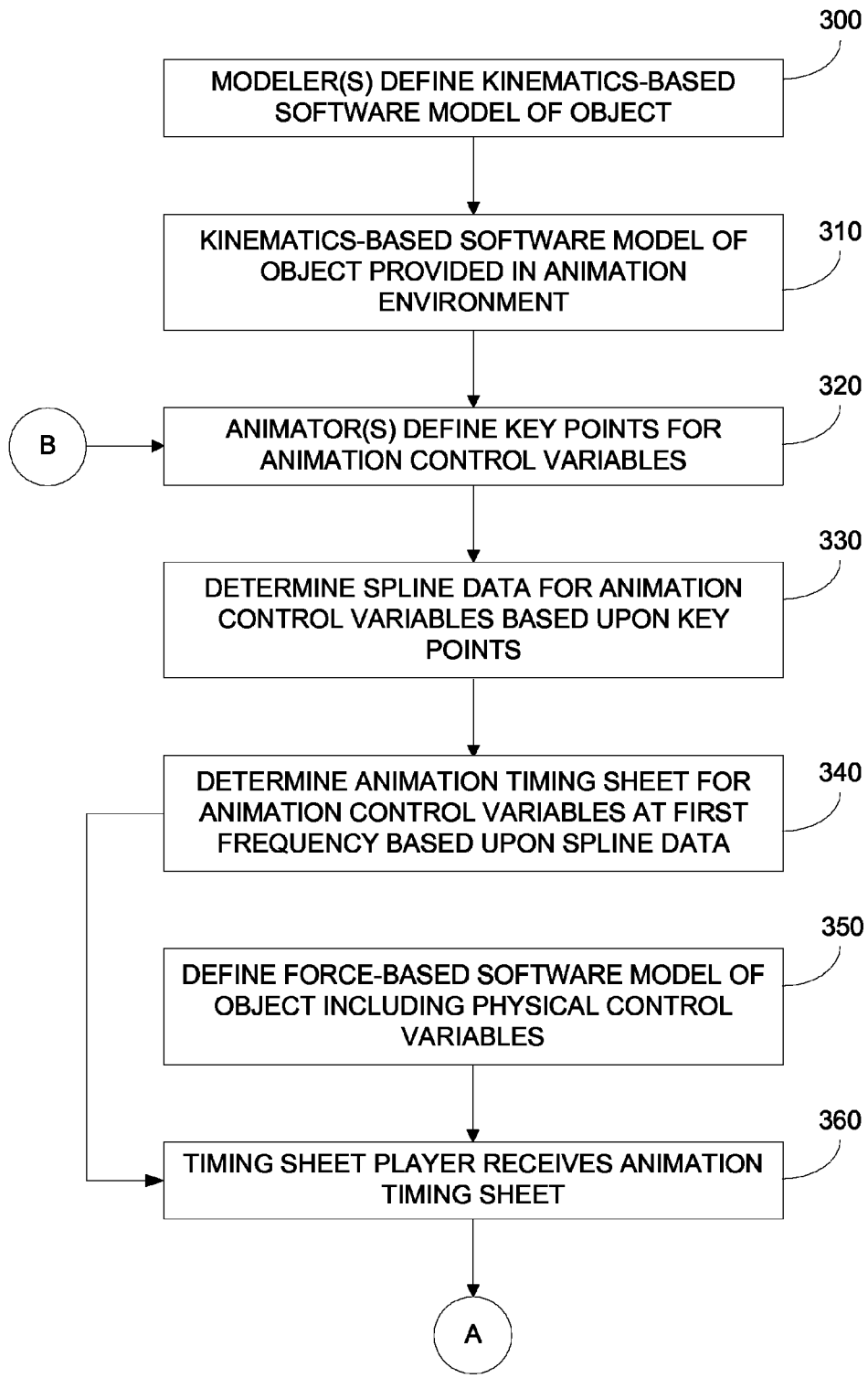
FIGS. 3A-C illustrate a flow diagram according to an embodiment of the present invention.
Figure 3B:
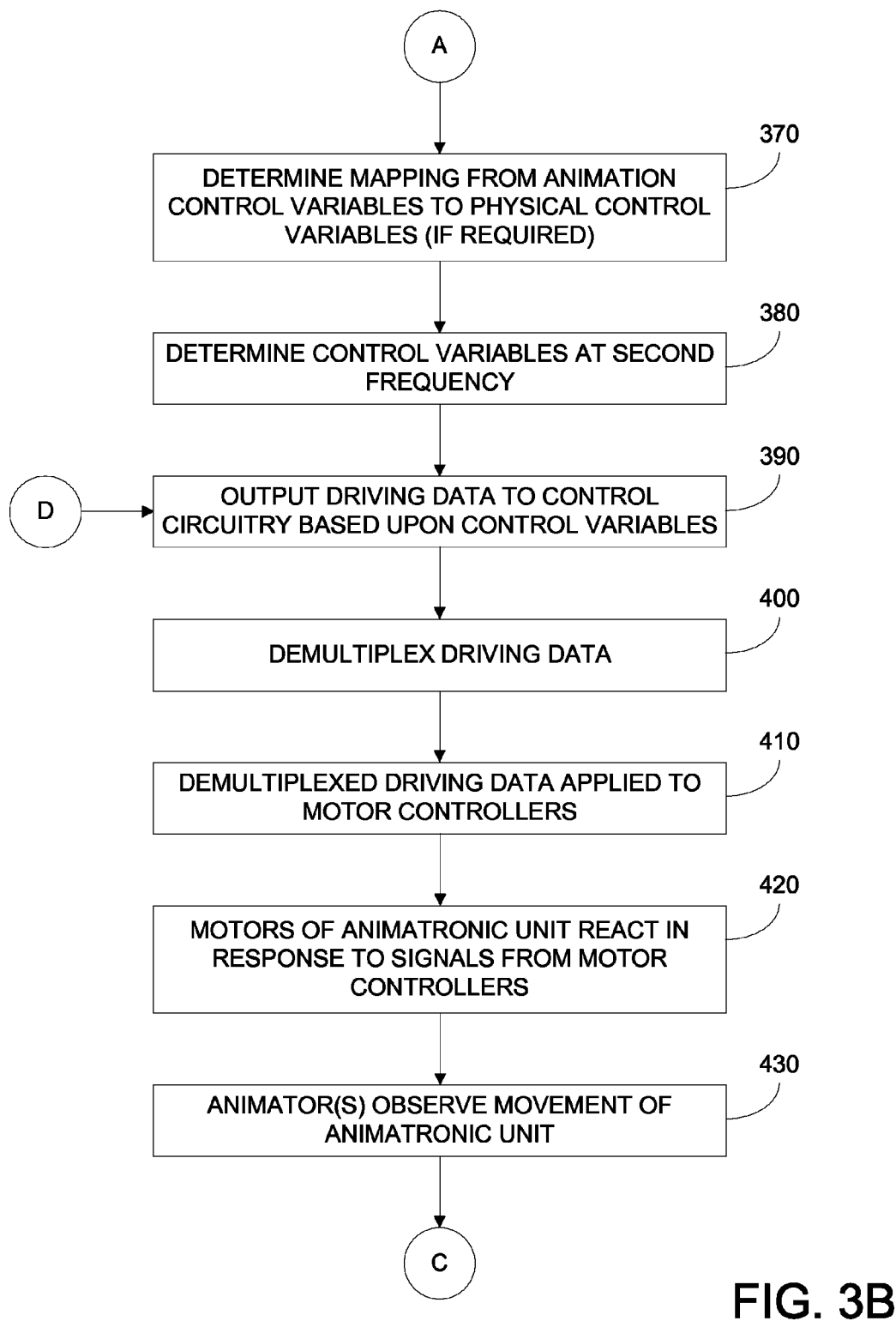

FIGS. 3A-B illustrate flow diagrams according to embodiments of the present invention. Initially, a software model of the desired object is determined, step 300. As discussed above, one or more users, typically called modelers, define kinematics-based software model 235 by defining components, interconnections between components, control points of which the user can set parameter values, and the like. In various examples, control points may map to one or more interconnections between components. For example, a control point may control a single parameter, such as angle of a forearm to the upper arm; a single control point may control multiple parameters, such as the closing of all fingers of a hand; and the like.

Once kinematics-based software model 235 is created, one or more users, typically called animators, opens kinematics-based software model 235 within a modeling animation environment, e.g. Menv, step 310. Within animator environment 230, the animator may define one or more values of specific control parameters of kinematics-based software model 235 at specific times, step 320. In various embodiments, these specific times are associated with key frames for one or more parameters in kinematics-based software model 235. As an example, the animator may define positions of an angle for a foot relative to the lower leg in "key" frames 1, 10 and 20; the animator may define positions of the lower leg relative to the upper leg in "key" frames 1, 50 and 100; or the like.

In various embodiments, a typical number of animation parameters may be on the order of 1000 to 10,000 animation parameters, or the like.

In various embodiments, based upon the values of the parameters for the specific key frames, splines are defined that pass through the defined values at the specific key frames, step 330. The use of splines in computing values of the parameters is very useful for animatronics applications, as smoothly varying parameters provides more realistic or believable motion. Additionally, the use of splines greatly reduces the number of values the animator needs to define when animating kinematics-based software model 235.

Next, in various embodiments, in response to the spline data, animation timing sheets 240 are determined, step 340. As discussed above, animation timing sheets 240 typically include a list of parameters for kinematics-based software model 235 at a certain number of values per second (corresponding to frames per second) (e.g. 24 fps, 1000 samples per second). In various embodiments, the values of the parameters, defined by the splines are specifically determined for each frame time (e.g. 24 fps), and that data may be stored in a flat file, or the like. Merely as an example, frame 0: {x=0.33, y=0.25, z=0.40}, frame 1: {x=0.45, y=0.25, z=0.40}, frame 2: {x=0.45, y=0.30, z=0.40}, frame 3: {x=0.50, y=0.30, z=0.50}, and the like.

In other embodiments, values of control parameters are only specified at times where they change in value. Merely as an example, frame 0: {x=0.33, y=0.25, z=0.40}, frame 1: {x=0.45}, frame 2: {y=0.30}, frame 3: {x=0.50, z=0.50}, and the like.

Animation timing sheets 240 help define the kinematics properties of the object. In various embodiments, animation timing sheets 240 may be the actual timing sheets used to animate the object in two-dimensions (e.g. for the animated feature).

In some embodiments of the present invention, a physical model of the object may be specified in a force-based (e.g. CAD) environment 270, step 350. As mentioned above, the physical design typically includes a detailed specification of components, such as materials (e.g. titanium, aluminum), material properties, motors (e.g. stepper, servo), characteristics of motors, etc. In various embodiments, it is desired that force-based software model 260 reflects the actual or desired construction of animatronics unit 220.

Within the force-based software model 260, the physical design may include a specification of properties of components, such as hydraulic pressure, maximum or typical slew rates, and the like. Additionally, based upon the physical design, the force-based environment can simulate the movement of the animatronics unit in software, based upon the physical characteristics, behavior, forces, or limitations of the object. For example, the force-based (e.g. CAD) environment may take into account physical characteristics of portions, e.g. mass, inertia, performance characteristics of components, e.g. power dissipation, slew rate, power requirements, step angles, speed, step angle accuracy, required voltage, drive current, torque, pump capacity, pressure per square inch, hydraulic head, horse power, flow rate, and the like, to simulate the motion of the object. Accordingly, the physical design of the object and the force-based design environment help define the dynamic properties of the object.

Figure 3C:
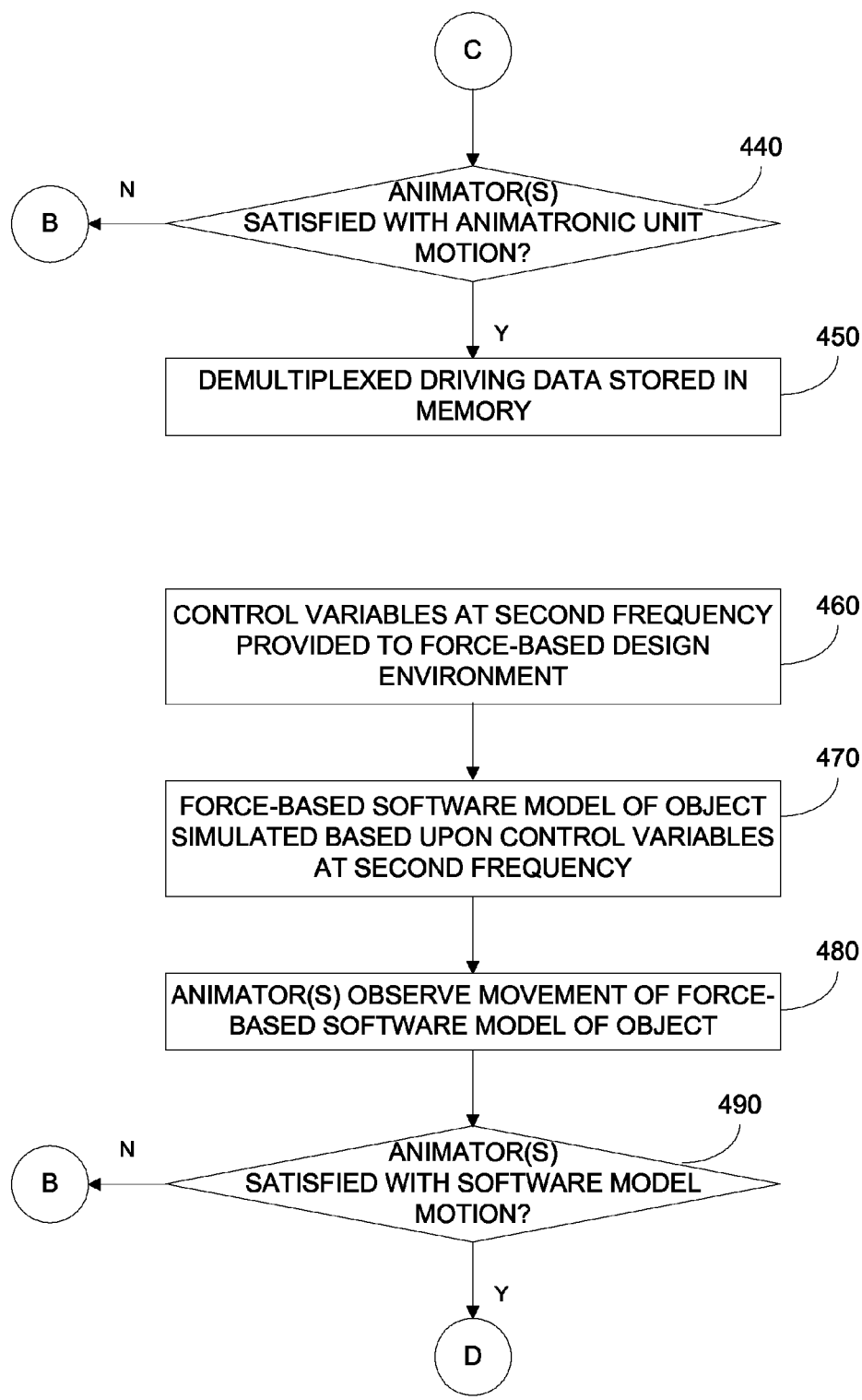
Figure 4:
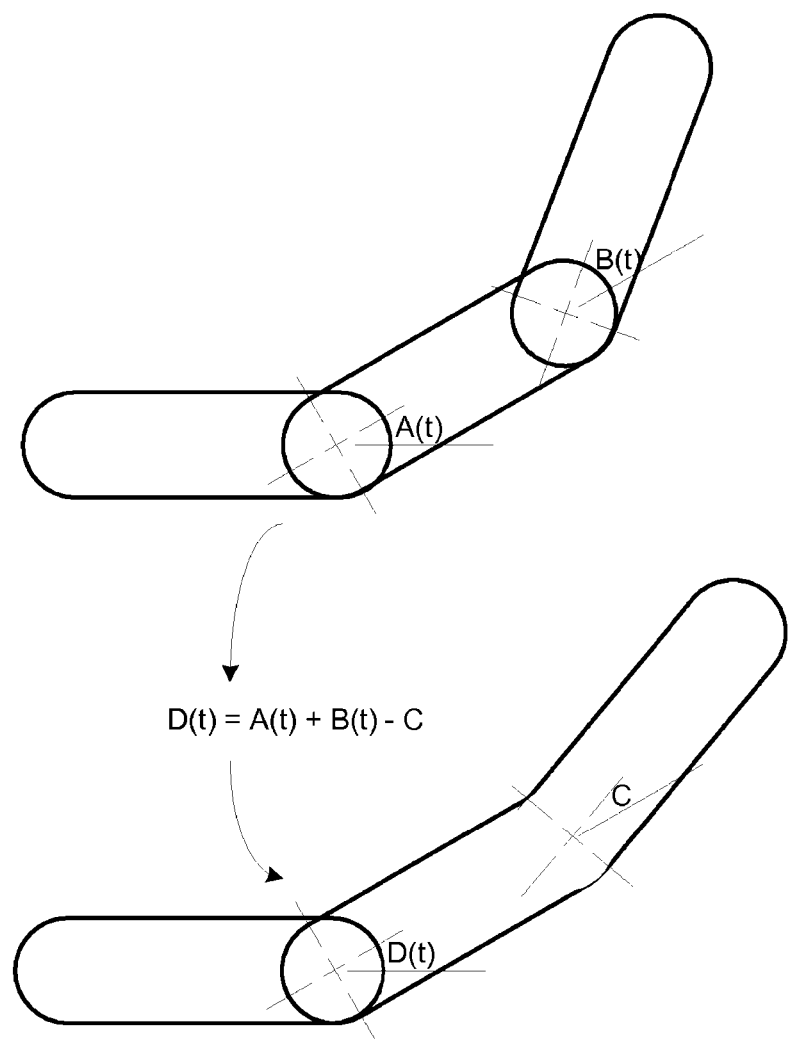
FIG. 4 illustrates an example according to an embodiment of the present invention.

Next, as illustrated in FIG. 3, animation timing sheet player 250 receives the animation timing sheets 240, step 360. In various embodiments, to take into account differences in kinematics-based software model 235 and force-based software model 260, values of parameters in kinematics-based software model 235 are mapped to values of the parameters in force-based software model 260, step 370. As an example: x=0.900 may be mapped to X1=0.100, X2=0900, as another example y=0.350, and z=0.500 may be mapped to Y=0.700. In other examples, parameters in the software model may not correspond to parameters in the force-based software model 260, and vice versa. An example of this mapping is given below.

In some embodiments of the present invention, the mappings between parameters of kinematics-based software model 235 and the force-based software model 260 may be manually performed. In other embodiments, the mappings may be determined automatically based upon comparison of kinematics-based software model 235 and the force-based software model 260.

In various embodiments, values for the parameters for kinematics-based software model 235 and force-based software model 260 are determined at a higher number of frames per second to determine animatronics driving data, step 380. As discussed above, typical animation timing sheets 240 specify values of parameters at a rate of 24 fps, although different number of samples per second are also contemplated. In various embodiments, in this step, the rate is increased to 100 fps, 5,000 samples per second, and values of parameters are determined based upon the original number of sampling rate. In other embodiments, other frame rates are contemplated, for example, from 25-100 samples per second, greater than 1000 samples per second, or the like. The number of values per second typically varies upon the number of parameters, the maximum output data rate of data onto data path 255, how fast animatronics unit 220 can move, or the like.

In various embodiments of the present invention, driving data for animatronics unit 220 are output to control circuitry 210 at the desired frame (sample) rate, step 390. In some embodiments, steps 370-390 may be performed with streaming data and overlapping steps, and in other embodiments, these computations may be performed in distinct and non-overlapping steps. In various embodiments, the data rate associated with data path 255 may be, for example, up to approximately 10 megabytes/second. In one example this is determined: data rate (e.g. 36 Kbytes/second)=the sampling rate, i.e. samples per second (e.g. 1,000 samples per second) *number of control channels (e.g. 36)*data per sample (e.g. 1 byte/sample). Accordingly, data path 255 may be implemented by a USB interface, Firewire interface, ISA bus, EISA bus, PCI bus, IR, WiFi, or the like.

In some embodiments, driving data may be multiplexed to reduce data bandwidth, and/or to ensure driving signals are received in parallel. Accordingly, in some embodiments, demultiplexer 280 demultiplexes the driving data to determine the animatronics driving values, step 400.

The animatronics driving values are then applied to the appropriate controllers 290 which in turn are applied to motors 225, (e.g. electrical, pneumatic or hydraulic motors), as appropriate, step 410. In various embodiments of the present invention, the animatronics driving values may provide digital or analog data to motors 225, as appropriate. In various examples, a motor 225 may be 256 position digital stepper motor that is driven with analog signals by controller 290 receiving an digital word (e.g. 8-bit). As another example, an animatronics motor 225 may include a servo motor driven by an analog signal which provides positional feedback based upon position of various components, for example. As still other examples, animatronics motors 225 may be hydraulic-based, pneumatic-based, or the like, as illustrated in FIG. 2.

In response to the animatronics driving values, the appropriate motors in animatronics unit 220 are directed to move to a particular point time, step 420. The process is then repeated, typically, at the same rate as the output number of frames per second, for subsequent frames.

In various embodiments of the present invention, it is contemplated that the animator may view the motion of animatronics unit 220, step 430. Further, if the motion is not acceptable, step 440, the animator may modify the key points in step 320, the splines in step 330, or the like. An example of when the animator may feel modifications are necessary is when an arm is past a stop or moved to a certain position. In more conventional animatronics system, a certain amount of "bouncing" is typically observed once a moving component reaches its destination, due to sudden braking of that component. In some embodiments, to reduce the amount of settling into a position, the animator may begin slowly braking the movement of the component before it reaches the position. As discussed above, this can be done by adding more key points before the time the arm reaches the position, and specifying a smoothly decelerating profile, or the like.

In some embodiments of the present invention, once the animator is satisfied with the motion of animatronics unit 220, the data used to drive controllers 290 may be recorded into a non-volatile memory, such as 295, step 450. In various embodiments, non-volatile memory may be semiconductor memory (e.g. flash memory), magnetic memory, optical memory, or the like.

In various embodiments, an embedded processor/non-volatile memory 295, controllers 290, motors 225 may be configured within animatronics unit 220. For example, animatronics unit 220 may be a stand-alone unit in an attraction, may be a toy, or the like. In such cases, animatronics unit 220 may also include an internal or external power source for powering motors 225. For example, animatronics unit may be coupled to a wall-type socket, 220 volt socket, battery supply, capacitor unit, or the like. Additionally, non-volatile memory 295 may be fixed or removable from animatronics unit.

In some cases, the actions of animatronics unit 220 may be more easily upgradeable by storing new data into non-volatile memory 295. Such data may be uploaded to non-volatile memory 295 via conventional manner, such as via USB port, via physical replacement of a flash memory module (e.g. compact flash, SD, Memory Stick), via wireless communication (e.g. Bluetooth, 802.11, IR, RFID).

In various embodiments of the present invention, as illustrated in FIG. 3, in cases where animatronics unit 220 is not available for testing, animators may simulate the motion of the object via force-based design environment 270. For example, the data in step 380 may be provided back to force-based design environment 270, step 460. In response, force-based design environment 270 simulates the movement according to this data, while taking into account the physical properties and limitations of the object, step 470. More specifically, force-based design environment 270 applies the movement inputs with limitations based upon mass of components, performance of the motors, accuracy of the motors, heat load, torque, and the like, as discussed above. Accordingly, it is expected that force-based design environment is able to give the animator a preview of how animatronics unit 220 may behave.

Similar to the above, the animator views the behavior of the CAD simulation, step 480, and if the animator is happy with the simulated behavior, step 490, the data in step 380 may be provided to animatronics unit 220. In various embodiments, if the animator is unhappy with the simulated behavior, the animator may revise the input data.

In various embodiments of the present invention, the above process is shown as typically an iterative process. In some cases it is expected that after the process has completed above, one or more of changes or refinements may be made to the design of animatronics unit 220, force-based software model 260, and/or kinematics-based software model 235. For instance, motors may be added or removed, dimensions or materials of components may change, additional elements may be added, and the like.

In some embodiments of the present invention, kinematics-based software model 235 may be designed and specified before force-based software model 260 or animatronics unit 220. In such cases, kinematics-based software model 235 may be animated by an animator via modeling environment 230. After kinematics-based software model 235 is designed, force-based software model 260 and animatronics unit 220 may be designed/built based upon kinematics-based software model 235, and the process described above may be performed. An advantage to this order for building models is that it provides freedom and flexibility of an object designer to define kinematics-based software model 235, without regard to how "realistic" the model is. For example, multi-dimensional joints, combined translating and rotating joints, stretching elements, and the like are easy to model, however are more difficult to physically implement.

In other embodiments, force-based software model 260 may be initially designed. After this, kinematics-based software model 235 and/or animatronics unit 220 may be built according to the specifications (e.g. placement of joints) of force-based software model 260, etc. In such cases, kinematics-based software model 235 are animated by an animator via modeling environment 230, and the process described above may be performed. An advantage to this process is that it is relatively straight-forward to define kinematics-based software model 235 based upon physical constraints included into force-based software model 260.

In still other embodiments, animatronics unit 220 may be built first. After this force-based software model 260 and kinematics-based software model 235 may be built according to the physical unit. Next, kinematics-based software model 235 may be animated by an animator via modeling environment 230, and the process described above may be performed. Advantages to this order for building models include that the animator can be sure that animatronics unit 220 can be built, and that the physical constraints are well-defined. Accordingly, defining kinematics-based software model 235 and force-based software model 260 that reflects the actual physical capabilities of animatronics unit 220 are straightforward.

Figure 5A:
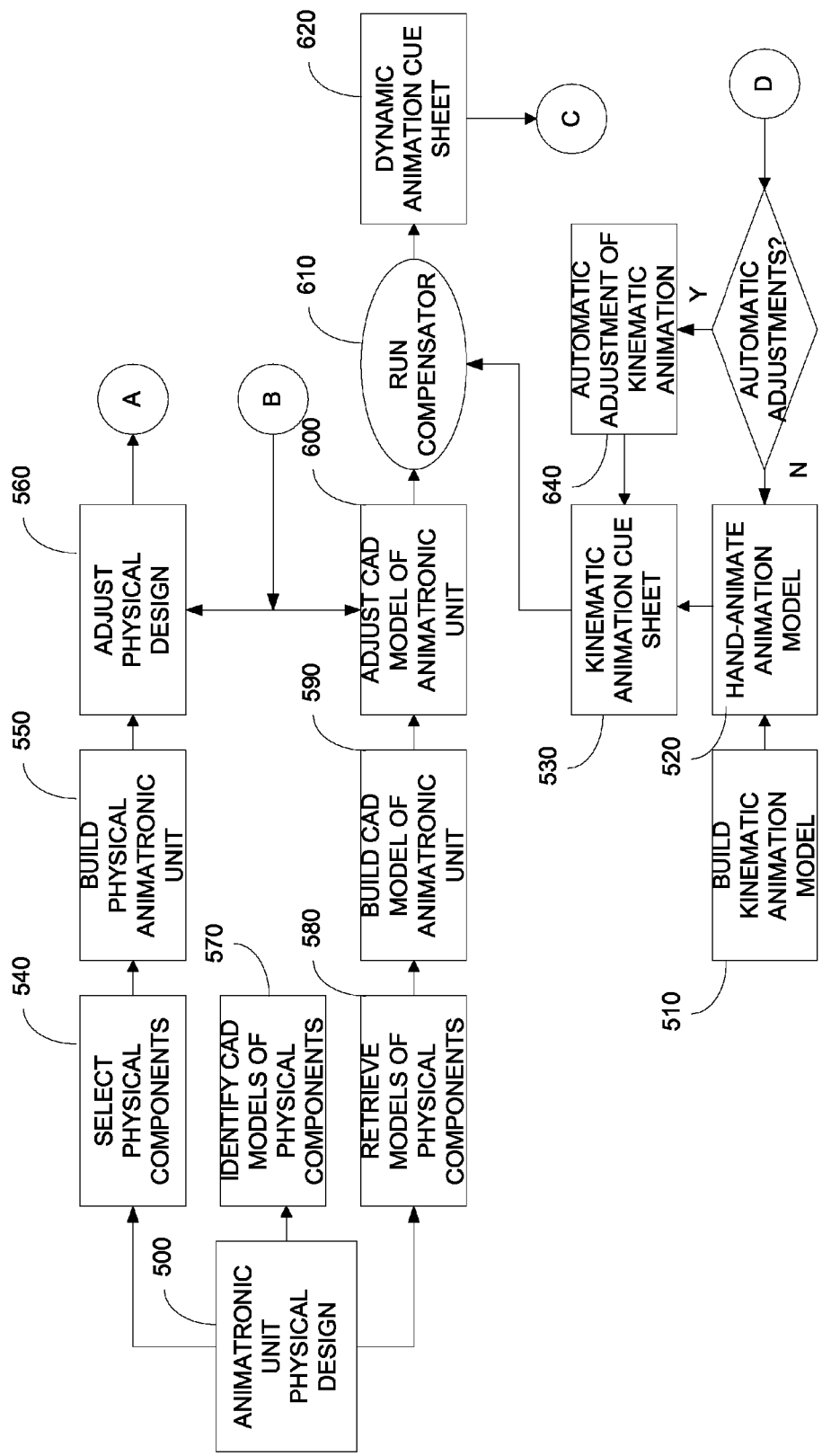
FIGS. 5A-B illustrates a block diagram of a system according to various embodiments of the present invention.
Figure 5B:
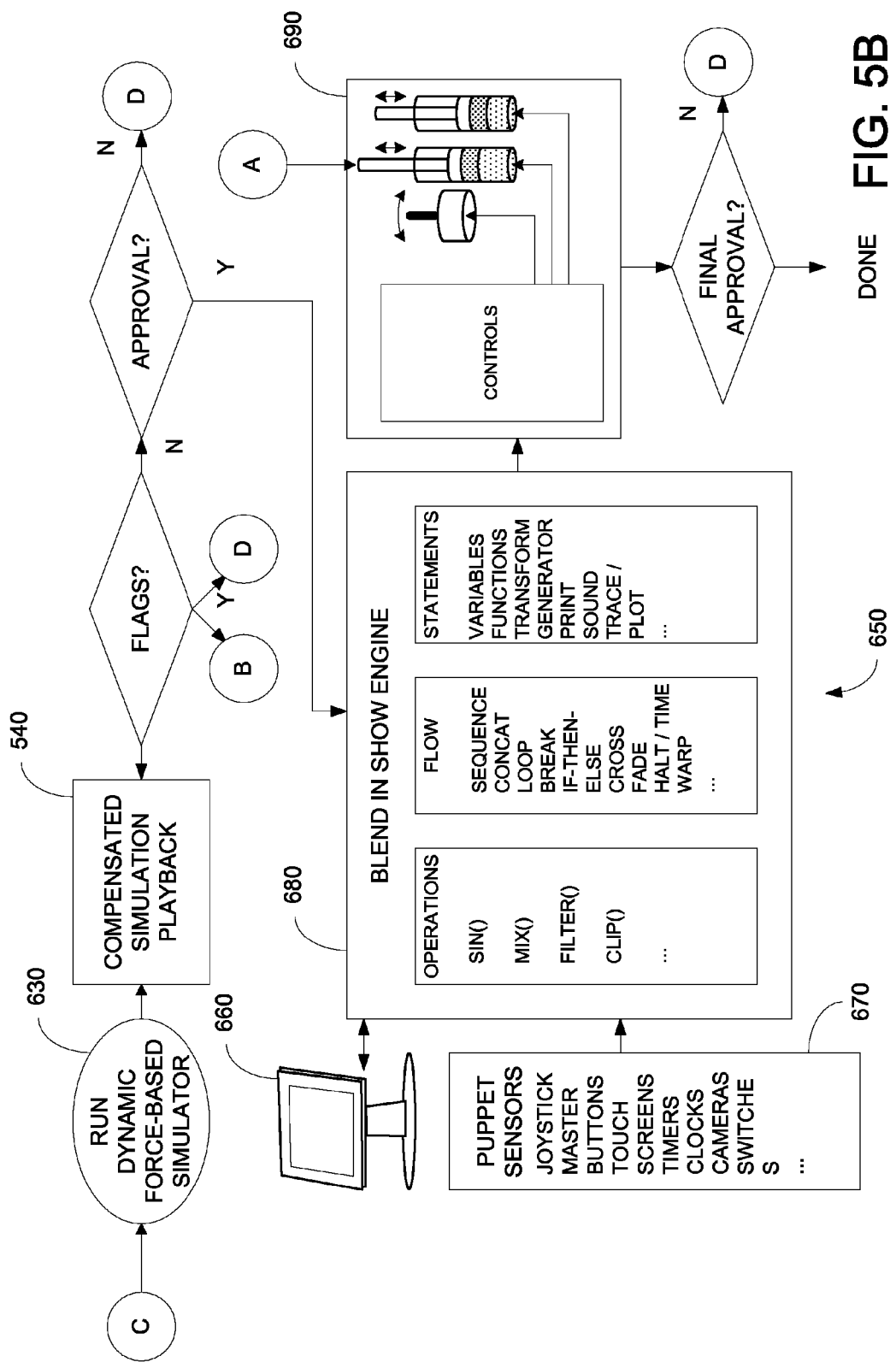

FIGS. 5A-B illustrate a block diagram of a system according to various embodiments of the present invention. In various embodiments, a design for an animatronics unit is specified by a designer in block 500. Based upon this design, a user (object modeler) uses the design to construct a kinematics animation model in block 510. In various embodiments, this may include specifying components of the kinematics model and specifying the animation control variables (avars) for driving the components. In block 520, a user (e.g. an animator) uses the rigging determined in block 510 to animate the animation model with respect to time. As discussed above, setting of the animation variables by the animator (typically hand-done) may represent the desired animation for the animation model for an animated feature, for the physical animatronics unit, or the like. In various embodiments, the animation data is stored in the form of an animation cue sheet (Q sheet), block 530, as discussed above.

As illustrated in FIGS. 5A-B, the design for the animatronics unit may also be used to build a physical animatronics unit. This process typically includes a user (e.g. a mechanical designer) selecting one or more physical components to implement the design, in block 540 and a user (e.g. the mechanical designer) building the physical animatronics unit in block 550. In various embodiments of the present invention, the user may have to modify the implementation of the physical animatronics unit, for example, depending upon real-world feedback, as illustrated in block 560. For example, a user may realize that a span cannot support an amount of weight it was designed to handle, thus she may specify a heavier span, a different pivot location, etc.

In various embodiments of the present invention, based upon the selection of physical components for the physical animatronics unit, computer-aided design (CAD) equivalent models of the physical components are determined and stored in block 570. In various embodiments, some CAD component models may be provided by respective vendors of the physical components, and in other embodiments, the CAD component models may be manually modeled.

Based upon the design of the animatronics unit from block 500, in block 580, and the CAD component models in block 570, a user (e.g. CAD designer) assembles the force-based software model 260 of the animatronics unit in block 590. In various embodiments, design variations of the force-based software model 260 compared to the design in block 500, may be provided to the users in block 510 for them to adjust the kinematics model. For example, when designing the force-based software model 260, it may be determined that fewer articulatable components are necessary; a smaller range of movement for the animatronics unit can be used, or the like, thus, the kinematics model may be simplified.

In various embodiments, in block 600, the user (e.g. CAD user) may have to modify the force-based software model 260 of the animatronics unit, depending upon feedback of a simulation system, discussed further below.

In block 610, the cue sheet data is run through a compensator, block 610, which compensates the animation timing data to help compensate for non-linearities in behavior of components in the force-based software model 260, and the like, block 610. In various embodiments of the present invention, the compensated cue sheet, 620, is then input into a dynamic animation simulator, where values of the animation variables are applied to the force-based software model 260 of the animatronics unit, in block, 630. The software simulated "playback" is identified in FIG. 15A, as block 640. The software simulation may include any number of break points, and/or flags, what may be used as feedback for block 600. Additionally, the feedback may be used by a user (e.g. animator) for further manual adjustment of the avars in block 520. In various embodiments, automatic adjustment to avars may be provided in block 640, as illustrated.

One result of the above process and diagram is a software simulation of the force-based software model 260 of the animatronics unit animated according to the avars set by an animator in the above-mentioned cue-sheets. The software simulation of the animatronics unit may be observed by one or more users. If the users do not approve of the animation illustrated by the software simulation, further modifications may be made to the animation variables.

In various embodiments, if the animation of the software simulated animatronics unit is satisfactory, the compensated animation cue sheet of block 620 may be stored and provided to an animatronics control framework, 650 for the physical animatronics unit, as illustrated in FIG. 15B. In various embodiments, the compensated animation cue sheet data may be converted into a "PAD" file format compatible with a Disney-specific animatronics framework.

In various embodiments, animatronics control framework 650 includes a display console 660, user (e.g. operator) control inputs 670, a show engine 680, and a physical animatronics unit 690. Physical animatronics unit 690 may, in some embodiments, be the same as the physical animatronics unit in block 550. In other embodiments, animatronics unit 690 may be "beefed-up" or a more production-ready version of block 550's physical animatronics unit. For example, in block 550, the physical animatronics unit may be considered a prototype.

In various embodiments, animatronics control framework 650 may control a number of other parameters associated with the animatronics unit. For example, parameters may include movements (e.g. movement of non-animation unit objects (e.g. boulders, props, etc.), input parameters (e.g. camera input, motion sensors, etc), physical outputs (e.g. flashing lights, sounds, scents, image display), and the like, in addition to movement animatronics unit. Such data along with the is referred to as "show data" within animatronics control framework 650. In various embodiments, as illustrated, further adjustments may be made to the animation data, as desired.

In light of the above disclosure, many other types of modifications to the above process are envisioned in other embodiments. For example, animation environment 230 and force-based design environment 270 may be merged into a single working environment. In other embodiments, functionality of a combined environment may also be greatly simplified. For example, it is envisioned that for well-defined animatronics unit (e.g. human-shaped unit), the combined environment may have a pre-defined combined (software and CAD) model. Accordingly, the user may simply use the pre-defined model to define the movement of the animatronics unit based upon the animation curve-type data (e.g. splines), and simulate the movement based upon physical limitations. Also, the user may upload the animation data to the animatronics unit to observe the actual movement. Such embodiments may be particularly useful for a hobbyist, for example.

In other embodiments of the present invention, motion of portions of the animatronics unit, based upon the animation curve data (e.g. splines) may be applied to existing robotic devices. In such examples, it is envisioned that animators may specify specific types of movements, via defining smoothly-varying/natural-looking curves. As discussed above, the resulting timing sheet data may then be used to control and/or manipulate the robotic devices. As an example, an existing robotic device that moves "robotically" may be programmed to move in smoother more natural ways.

Other embodiments of the present invention may be applied to the toy industry. In such examples, animatronics unit 220 may include a memory that includes data derived from the animation timing sheets. As discussed above, these animation timing sheet data are determined by one or more animators to specify "natural" looking movements for the toy. In such embodiments, the data in the memory may be fixed, e.g. a ROM, or the data in the memory may be upgraded. As discussed above, many ways for upgrading the data are contemplated including connection to a computer, wirelessly, removable memory, and the like. Current state of the art toys, as illustrated by toys such as T.M.X. Elmo have movement that is robotic and unnatural. Accordingly, it is believed by the inventors of the present invention that using the principles described above, toys in the future may have movement that is more natural and artistically pleasing than currently possible. Embodiments may be applied to amusement park attractions, rides, performances, vehicles, or the like, to "perform" artistically-determined movements for guests. Additionally, the teaching of the present invention may be applied to other types of electrical/mechanical/hydraulic/pneumatic devices.

Further embodiments can be envisioned to one of ordinary skill in the art after reading this disclosure. In other embodiments, combinations or sub-combinations of the above disclosed invention can be advantageously made. The block diagrams of the architecture and graphical user interfaces are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for specifying an animatronics unit:
    receiving a force-based software model for the animatronics unit;
    receiving a kinematics-based software model for the animatronics unit;
    receiving animation data for animating the kinematics-based software model, wherein the animation data comprises artistically determined motions for the kinematics-based software model by a user;
    determining a plurality of driving signals in response to the animation data;
    animating the force-based software model of the animatronics unit in response to the plurality of driving signals;
    displaying animation of the force-based software model determined in response to the plurality of driving signals;
    receiving compensation data from the user, in response to the animation of the force-based software model;
    determining a plurality of modified driving signals in response to the animation of the force-based software model and in response to the compensation data;
    animating the force-based software model in response to the plurality of modified driving signals;
    displaying animation of the force-based software model in response to the plurality of modified driving signals; and
    determining a specification for construction of the animatronics unit in response to animation of the force-based software model.

2. The method of claim 1 further comprising
    receiving modified animation data for animating the force-based software model, wherein the modified animation data comprises artistically determined modified motions for the animatronics unit by the user, in response to animation of the force-based software model;

determining a plurality of modified driving signals in response to the modified animation data;
animating the force-based software model in response to the plurality of driving signals; and
displaying animation of the force-based software model determined in response to the plurality of modified driving signals.

3. The method of claim 1 further comprising:
constructing the animatronics unit in response the specification for construction of the animatronics unit; and
animating the animatronics unit in response to the plurality of driving signals.

4. The method of claim 3 further comprising
receiving modified animation data for animating the kinematics-based software model, wherein the modified animation data comprises artistically determined modified motions for the kinematics-based software model by a user, in response to animation of the animatronics unit;
determining a plurality of modified driving signals in response to the modified animation data; and
animating the animatronics unit in response to the plurality of modified driving signals.

5. The method of claim 3 further comprising
determining a plurality of modified driving signals in response to animation of the animatronics unit; and
animating the animatronics unit in response to the plurality of modified driving signals.

6. A computer system comprising:
a memory configured to store a force-based software model for the animatronics unit, wherein the memory is configured to store a kinematics-based software model for the animatronics unit, wherein the memory is configured to store animation data for animating the kinematics-based software model, wherein the animation data comprises artistically determined motions for the kinematics-based software model by a user;
a processor coupled to the memory, wherein the processor is configured to determine a plurality of driving signals in response to the animation data, wherein the processor is configured to animate the force-based software model of the animatronics unit in response to the plurality of driving signals; and
a display coupled to the processor, wherein the display is configured to display animation of the force-based software model determined in response to the plurality of driving signals;
wherein the processor is also configured to output a specification for construction of the animatronics unit in response to animation of the force-based software model;
wherein the processor is configured to receive compensation data from the user, in response to the animation of the force-based software model; and
wherein the processor is configured to determine the plurality of modified driving signals in response to the compensation data.

7. The computer system of claim 6
wherein the processor is also configured to receive modified animation data for animating the force-based software model, wherein the modified animation data comprises artistically determined modified motions for the animatronics unit by the user, in response to animation of the force-based software model;
wherein the processor is also configured to determine a plurality of modified driving signals in response to the modified animation data;
wherein the processor is also configured to animate the force-based software model in response to the plurality of driving signals; and
wherein the display is configured to display animation of the force-based software model determined in response to the plurality of modified driving signals.

8. The computer system of claim 6
wherein the processor is configured to determine a plurality of modified driving signals in response to the animation of the force-based software model;
wherein the processor is configured to animate the force-based software model in response to the plurality of modified driving signals; and
wherein the display is configured to display animation of the force-based software model in response to the plurality of modified driving signals.

9. A method for specifying an animatronics unit comprising:
determining a force-based software model for the animatronics unit;
determining a kinematics-based software model for the animatronics unit;
receiving animation data for animating the kinematics-based software model, wherein the animation data comprises artistically determined motions by a user;
animating the force-based software model in response to the animation data;
displaying animation of the force-based software model determined in response to the animation data; and
determining a physical implementation of the animatronics unit in response to animation of the kinematics-based software model, comprising:
a) determining an initial physical implementation of the animatronics unit; and
b) determining the physical implementation of the animatronics unit in response to animation of the kinematics-based software model and to the initial physical implementation;
wherein the initial physical implementation comprises an initial implementation of a component of the animatronics unit consisting of a first material;
wherein the physical implementation comprises an implementation of the component of the animatronics unit consisting of a second material instead of the first material; and
wherein the first material has a density different from a density of the second material.

10. The method of claim 9
wherein the initial physical implementation comprises an initial implementation of a component of the animatronics unit having a first performance characteristic;
wherein the physical implementation comprises an implementation of the component of the animatronics unit having a second performance characteristic instead of the first performance characteristic.

11. The method of claim 10
wherein the first performance characteristic is selected from a group consisting of: power dissipation, slew rate, power requirements, step angles, speed, step angle accuracy, required voltage, drive current, torque, pump capacity, pressure per square inch, hydraulic head, horse power, flow rate.

12. The method of claim 9
wherein the initial physical implementation comprises an initial implementation of a joint of the animatronics unit having a first location;

wherein the physical implementation comprises an implementation of the joint of the animatronics unit having a second location instead of the first location.

13. A method for specifying an animatronics unit comprising:
- determining a force-based software model for the animatronics unit;
- determining a kinematics-based software model for the animatronics unit;
- receiving animation data for animating the kinematics-based software model, wherein the animation data comprises artistically determined motions by a user;
- animating the force-based software model in response to the animation data;
- displaying animation of the force-based software model determined in response to the animation data; and
- determining a physical implementation of the animatronics unit in response to animation of the kinematics-based software model, comprising:
  - a) determining an initial physical implementation of the animatronics unit; and
  - b) determining the physical implementation of the animatronics unit in response to animation of the kinematics-based software model and to the initial physical implementation;
- wherein the initial physical implementation comprises an initial implementation of a component of the animatronics unit having a first dimension;
- wherein the physical implementation comprises an implementation of the component of the animatronics unit having a second dimension instead of the first dimension.

14. The method of claim 13
wherein the initial physical implementation comprises an initial implementation of a component of the animatronics unit having a first performance characteristic;
wherein the physical implementation comprises an implementation of the component of the animatronics unit having a second performance characteristic instead of the first performance characteristic.

15. The method of claim 14
wherein the first performance characteristic is selected from a group consisting of: power dissipation, slew rate, power requirements, step angles, speed, step angle accuracy, required voltage, drive current, torque, pump capacity, pressure per square inch, hydraulic head, horse power, flow rate.

16. The method of claim 13
wherein the initial physical implementation comprises an initial implementation of a joint of the animatronics unit having a first location;
wherein the physical implementation comprises an implementation of the joint of the animatronics unit having a second location instead of the first location.

17. A method for a computer system for controlling an animatronics unit comprises:
receiving an animation timing sheet specifying a plurality of animation values at a first rate of values per time period;
determining a plurality of driving values at a second rate of values per time period in response to the plurality of animation values, wherein the second rate is greater than the first rate;
animating the animatronics unit in response to the plurality of driving values at the second rate of values per time period.

18. The method of claim 17 wherein the method further comprises:
receiving a specification of a software model of the animatronics unit; and
animating the software model of the animatronics unit in response to the plurality of driving values at the second rate of values per time period.

19. The method of claim 17
wherein the plurality of animation values are associated with a plurality of curves;
wherein the method further comprises:
modifying the plurality of curves to form a plurality of modified animation values at the first rate of values per time period, in response to animation of the animatronics unit in response to the plurality of driving values;
determining a plurality of modified driving values at the second rate of values per time period in response to the plurality of modified animation values; and
animating the animatronics unit in response to the plurality of modified driving values at the second rate of values per time period.

20. An animatronics device comprising:
a plurality of motors, wherein each motor is configured to be driven by motor driving data;
a first portion and a second portion, coupled via a motor from the plurality of motors;
a memory configured to store a plurality of motor driving data, wherein motor driving data associated with a the motor from the plurality of motors comprises driving data at a first rate of data per time period, wherein the driving data is determined in response to animation timing data, wherein the animation timing data comprises animation data at a second rate of data per time period, wherein the first rate exceeds the second rate, and wherein the animation timing data is determined in response to animation curve data defined by a user; and
a processor coupled to the memory and to the motor, wherein the processor is configured to retrieve the motor driving data from the memory and configured to apply the motor driving data to the plurality of motors at the first rate.

21. The animatronics device of claim 20 wherein the processor is configured to determine the motor driving data in response to the animation data.

22. The animatronics device of claim 20 wherein the memory is selected from a group consisting of: replaceable memory, writable memory.

23. The animatronics device of claim 20 further comprising a power source configured to power the plurality of motors, the memory, and the processor;
wherein the power source is selected from a group consisting of: battery, capacitor.

* * * * *

UNITED STATES PATENT AND TRADEMARK OFFICE
CERTIFICATE OF CORRECTION

PATENT NO. : 8,368,700 B1  
APPLICATION NO. : 11/958163  
DATED : February 5, 2013  
INVENTOR(S) : DiFrancesco et al.

Page 1 of 1

It is certified that error appears in the above-identified patent and that said Letters Patent is hereby corrected as shown below:

In the Claims:

Column 18, Line 35, Claim 20: delete "with a the" and insert --with the--.

Signed and Sealed this  
Twenty-second Day of October, 2013

Teresa Stanek Rea  
*Deputy Director of the United States Patent and Trademark Office*